United States Patent [19]

Diachuk

[11] 4,216,003
[45] Aug. 5, 1980

[54] GAS CLEANING SYSTEM

[75] Inventor: Wolodymyr Diachuk, Minneapolis, Minn.

[73] Assignee: Century 21 Pollution Control, Inc., Minneapolis, Minn.

[21] Appl. No.: 961,376

[22] Filed: Nov. 16, 1978

[51] Int. Cl.² .............................................. B01D 46/30
[52] U.S. Cl. ...................................... 55/356; 55/479; 55/484; 55/502; 55/508; 55/518; 422/239
[58] Field of Search ................. 55/350, 478, 357, 479, 55/480, 484, 502, 506, 508, 515, 518, 356, 516; 210/323 R, DIG. 10; 422/239, 312

[56] References Cited

U.S. PATENT DOCUMENTS

| | | | |
|---|---|---|---|
| 2,016,033 | 10/1935 | Christofferson | 55/484 |
| 2,044,221 | 6/1936 | Myers et al. | 55/483 |
| 2,463,382 | 3/1949 | Hobbs | 55/508 |
| 2,829,735 | 4/1958 | Kroll | 55/484 |
| 3,177,637 | 4/1965 | Davis | 55/483 |
| 3,243,942 | 4/1966 | Burke | 55/387 |
| 3,344,590 | 10/1967 | Smith et al. | 55/484 |
| 3,354,622 | 11/1967 | Murphy, Jr. | 55/484 |
| 3,354,623 | 11/1967 | Keller | 55/484 |
| 3,383,841 | 5/1968 | Olson et al. | 55/502 |
| 3,411,273 | 11/1968 | Duncan et al. | 55/387 |
| 3,411,273 | 11/1968 | Duncan et al. | 55/484 |
| 3,487,625 | 1/1970 | Lucas | 55/483 |
| 3,576,095 | 4/1971 | Rivers | 55/484 |
| 3,675,394 | 7/1972 | Sterrett | 55/515 |
| 3,969,095 | 7/1976 | Kurahashi | 55/479 |
| 4,023,944 | 5/1977 | Beane | 55/502 |
| 4,049,406 | 9/1977 | Rivers | 55/484 |
| 4,129,429 | 12/1978 | Humbert, Jr. et al. | 55/484 |

FOREIGN PATENT DOCUMENTS

| | | | |
|---|---|---|---|
| 893649 | 10/1944 | France | 55/350 |
| 932585 | 3/1948 | France | 55/480 |

Primary Examiner—David L. Lacey
Attorney, Agent, or Firm—Burd, Bartz & Gutenkauf

[57] ABSTRACT

A gas cleaning system having a gas filtering unit that is removably supported in a housing. The housing has a pair of rails containing upwardly open pockets. Hangers on the filtering unit have lips that fit into the pockets to support the unit on the rails in a selected position in the housing. A peripheral seal on the lower part of the housing engages the bottom of the filtering unit to insure that all the gas flows through the filtering unit. The gas filtering material is stored in chambers formed by spaced perforated walls in the unit. The tops of the chambers are closed with covers carrying the hangers.

28 Claims, 12 Drawing Figures

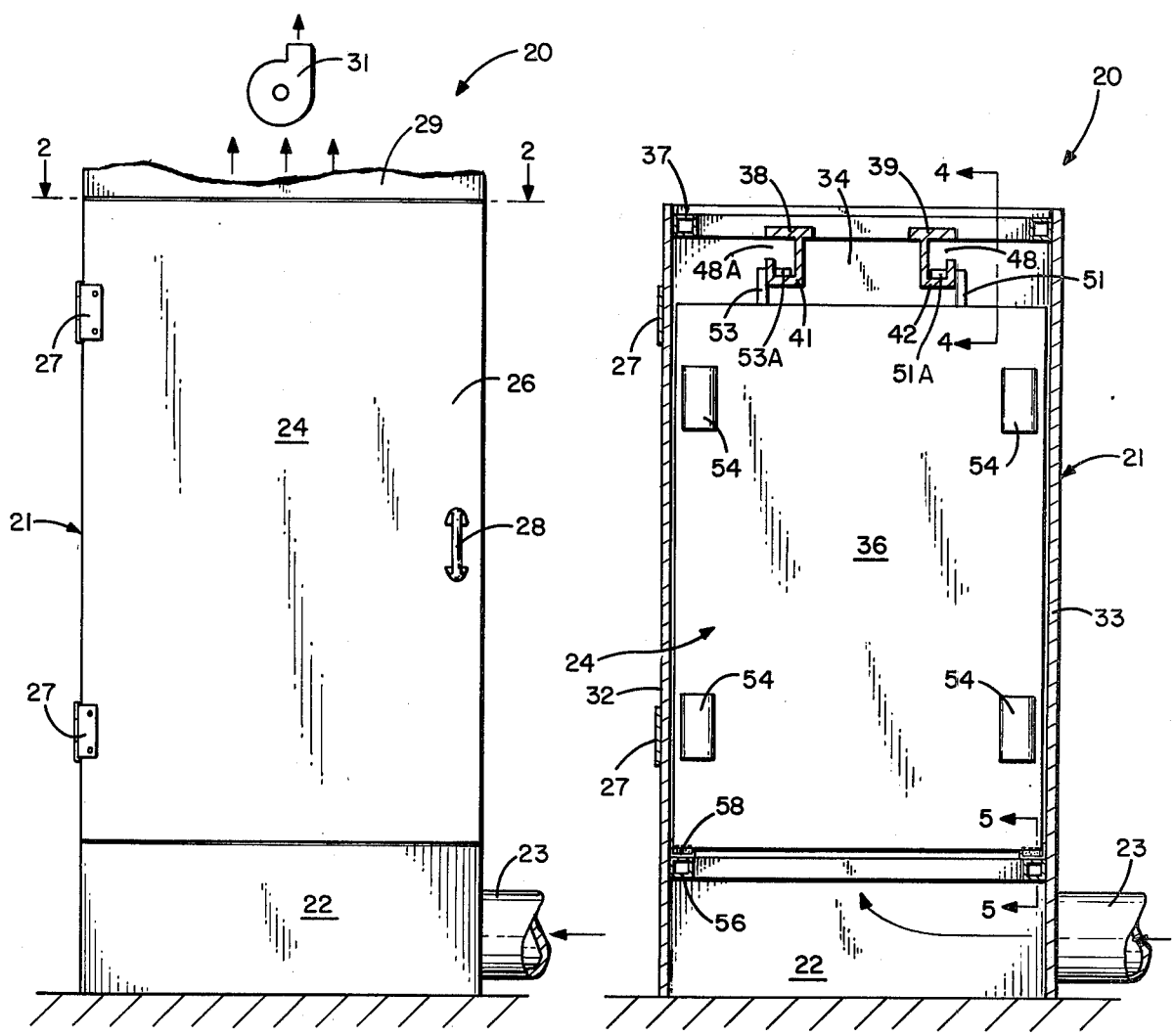
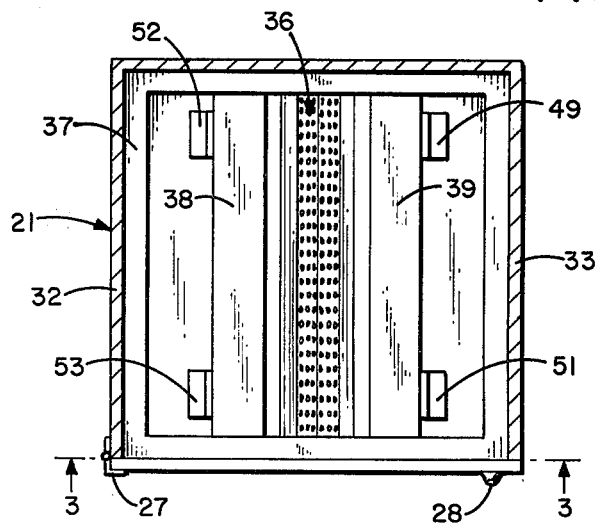
FIG. 1　FIG. 3
FIG. 2

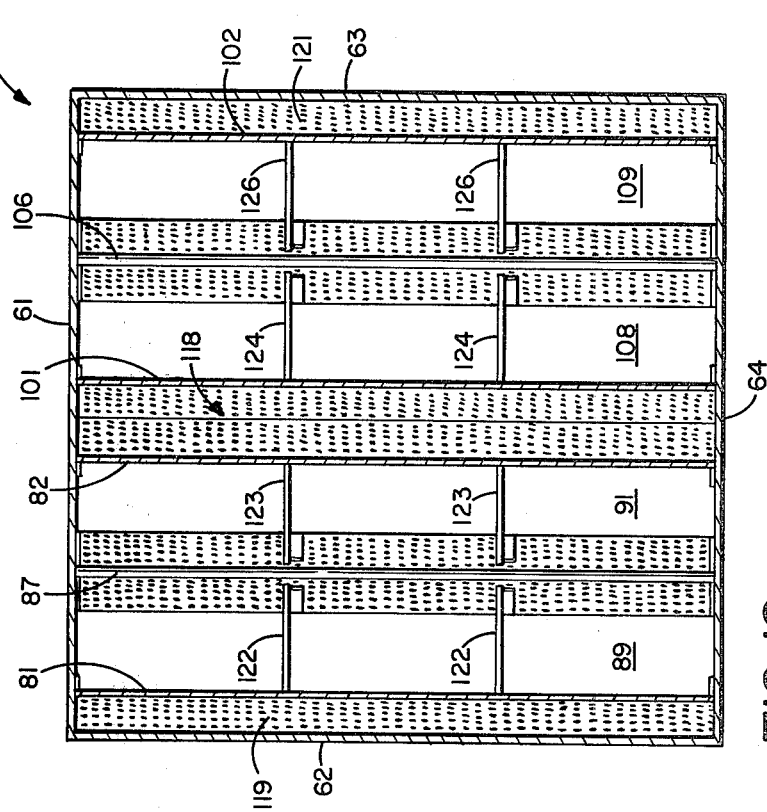
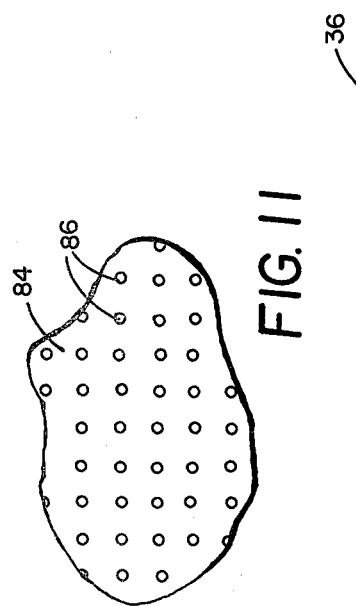
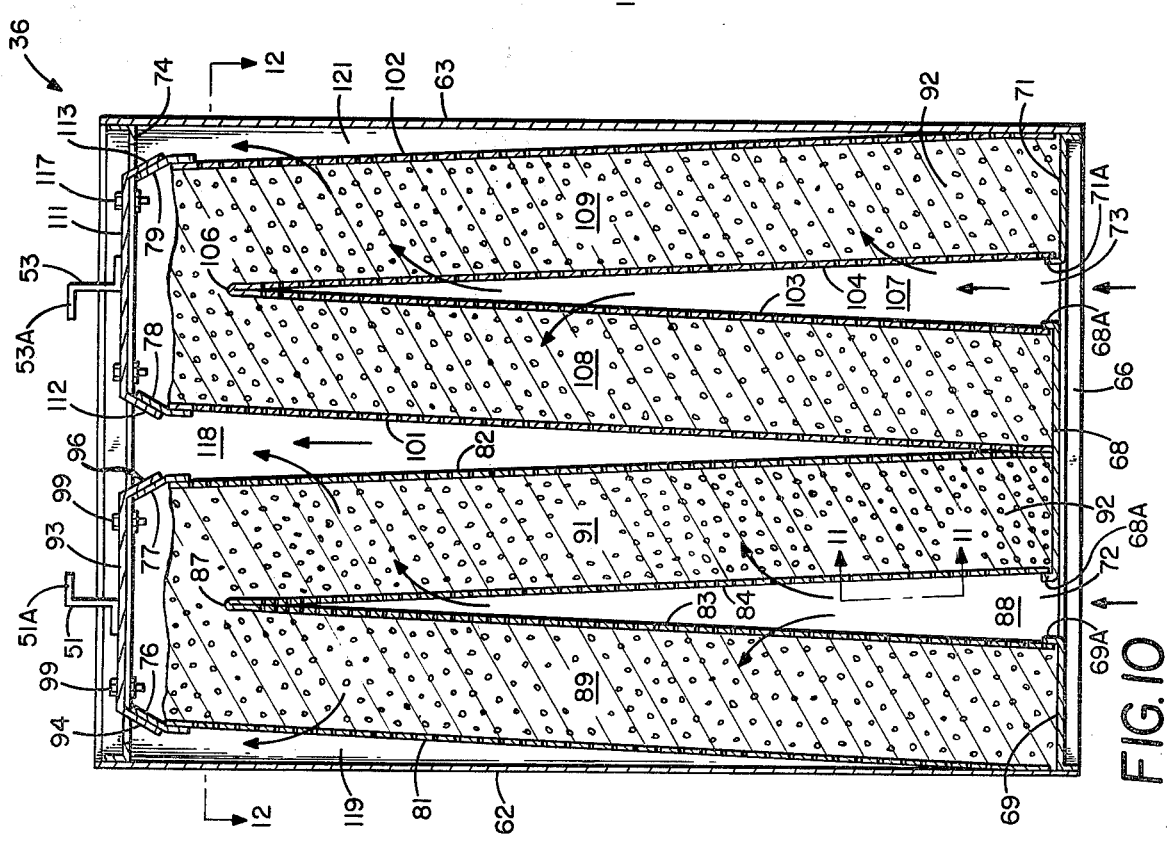

GAS CLEANING SYSTEM

BACKGROUND OF INVENTION

The invention is directed to a gas filtering structure useable in an air handling system to remove foreign materials, as odors, particulates, greases, dust, aerosols, and chemicals from the gas. It is known to use gas purifying material, such as activated carbon, in cartridges having perforated walls for purifying and filtering gas. The activated carbon must be periodically removed from the filtering structure and heated to reactivate the carbon. This requires the disassembly of the filtering structure requiring considerable time and labor. The gas filtering structure of the invention has overcome the disadvantages of the prior art.

SUMMARY OF INVENTION

The invention is directed to a gas cleaning system that utilizes a gas filtering unit in association with a housing for accommodating the filtering unit. The housing has supports which cooperate with hangers on the filtering unit to locate the filtering unit in the housing. The bottom of the filtering unit cooperates with a seal mounted on the housing that minimizes the leakage of gas around the housing so that substantially all of the gas must flow through the filtering material located in the filtering unit. The filtering unit contains a plurality of angularly inclined walls forming a plurality of chambers for accommodating the filtering material. Removable covers are mounted on the top portions of the walls to enclose the filtering material in the chambers. The hanger structures are secured to the covers. The hangers are brackets having inwardly directed lips. The lips cooperate with pockets in longitudinal rail means to locate the filter unit in the housing in alignment with the seal. The entire filtering unit is removed from the housing when it is necessary to reactivate the filtering material. The filtering unit is transported to a material reactivating area remote from the filtering system. The filtering unit can be shipped a considerable distance to a plant which reconditions and reactivates the filtering media. The filtering material is removed from the unit by removing the cover. The entire unit is then turned upside down so that the material can flow out of the chamber. The active filter material is replaced in the chamber and confined therein when the cover is reattached to the unit. The filtering unit is then shipped back to the gas filtering system and mounted in the housing. A transport vehicle, such as a lift truck, is used to elevate and move the filtering unit in the housing. The hangers cooperate with the support rails to guide and locate the filtering unit in the housing.

An object of the invention is to provide a portable gas filtering unit that can be easily shipped and handled, permitting the filtering medium to be reactivated in a convenient and economical manner. Another object of the invention is to provide a gas filtering structure with a housing having supports for accommodating hangers for a gas filtering means. The hangers have locating structures which position the filtering unit within the housing. A further object of the invention is to provide a gas filtering system with the filtering unit that cooperates with seals to insure the flow of gas through the filtering material. These and other objects and advantages of the gas filtering system and filtering unit of the invention are set forth in the following detailed drawings and description.

IN THE DRAWINGS

FIG. 1 is a front elevational view of a gas filtering apparatus of the invention;

FIG. 2 is a sectional view taken along the line 2—2 of FIG. 1;

FIG. 3 is a sectional view taken along the line 3—3 of FIG. 2;

FIG. 10 is an enlarged sectional view taken along the line 10—10 of FIG. 7;

FIG. 11 is an enlarged side view looking along the line 11—11 in the direction of the arrows of FIG. 10; and FIG. 12 is a sectional view taken along the line 12—12 of FIG. 10 with the filtering material removed.

DESCRIPTION OF PREFERRED EMBODIMENTS

Figure 4:
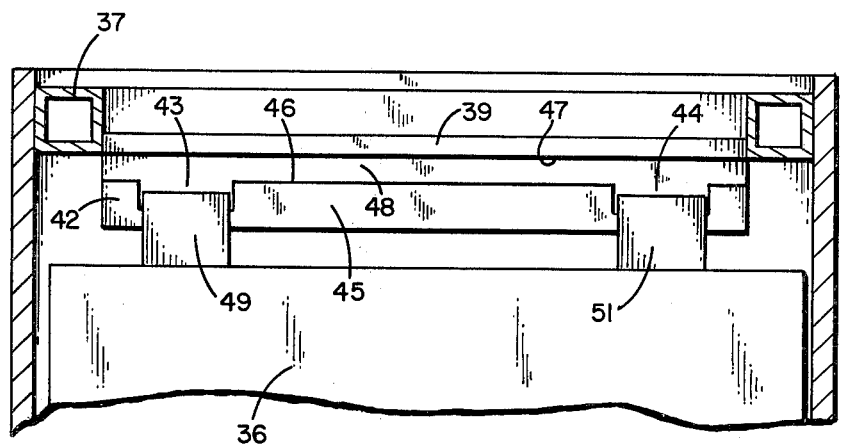
FIG. 4 is an enlarged sectional view taken along the line 4—4 of FIG. 3.

Referring to the drawing, there is shown in FIGS. 1 to 3 a gas filtering system indicated generally at 20 operable to remove particulates, aerosols and odors from gas, as air. Filtering system 20 has a generally upright rectangular housing 21. The lower portion of housing 21 has a gas intake section 22. A gas intake tube 23 is used to carry gas and foreign materials into the intake section 22. Located above intake section 22 is a filtering section 24. Filtering section 24 has a front door 26. A pair of hinges 27 and a latch handle 28 operatively mount the door 26 on the filtering section walls 32 and 33. An outlet section 29 is located above filtering section 24. An air mover such as a fan or blower 31 located in outlet section 29 operates to draw gas through air filtering system 20. Blower 31 can be located at a convenient place in the outlet duct work so that it operates to draw gas through filtering section 24.

As shown in FIG. 3, filtering section 24 has a pair of upright side walls 32 and 33 defining a filtering chamber 34. A gas filtering unit indicated generally at 36 is located in chamber 34. Unit 36 can be removed from chamber 34 to recharge and replace the filtering material stored therein.

Referring to FIGS. 2 and 3, a generally rectangular frame 37 is secured to the side walls 32 and 33 of the upper part of filtering section 24. Frame 37 comprises rectangular shaped beams which extend around the opening in the upper end of housing 21. A pair of cross plates 38 and 39 mounted on the frame 37 extend across the top of chamber 34 of housing 21. As shown in FIG. 3, hook rails 41 and 42 are secured to the lower sides of cross plates 38 and 39, respectively. Referring to FIG. 4, hook rail 42 has a pair of recesses or pockets 43 and 44 adjacent opposite ends of the rail. An upright short flange 45 has a horizontal upper edge 46 that is spaced below the lower wall 47 of cross plate 39. An elongated horizontal space 48 between edge 46 and lower wall 47 permits hanger brackets 49 and 51 to be moved relative to hook rail 42 so that hanger brackets 49 and 51 can be located in the positioning pockets 43 and 44. Hanger brackets 49 and 51 have inwardly directed horizontal lips 49A and 51A that fit in the pockets 43 and 44 in flange 45.

Hook rail 41 is identical to rail 42. It has a J-shaped cross section and a pair of positioning pockets in the short flange of the rail. Hanger brackets 52 and 53 secured to the top of filtering unit 36 are adapted to be positioned in the pockets in rail 41 to locate air filtering unit 36 in chamber 34. Hanger brackets 52 and 53 have inwardly directed lips 52A and 53A that fit in the pockets in rail 41.

Figure 6:
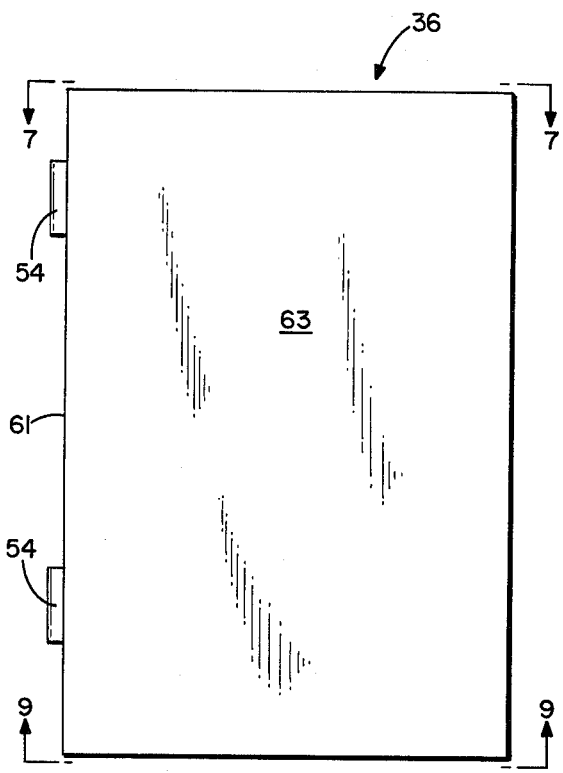
FIG. 6 is a side elevational view of the gas filter unit of the invention.
Figure 8:
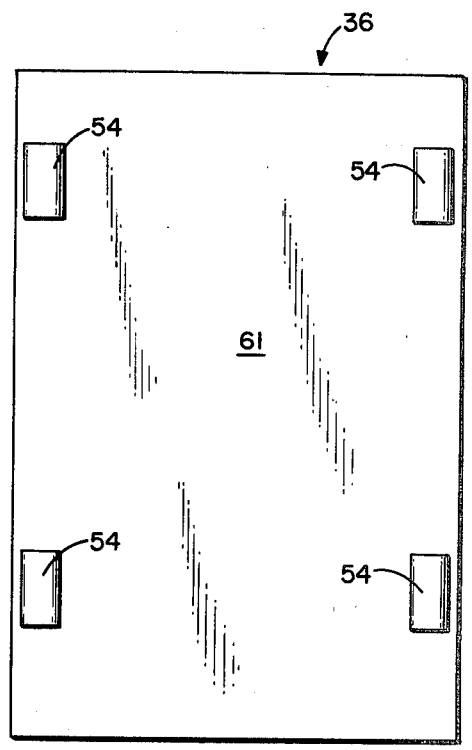
FIG. 8 is a rear elevational view of FIG. 6.

As shown in FIGS. 3, 6, and 8, gas filtering unit 36 has a plurality of carrier members 54 secured to its side wall. Carrier members 54 are used to accommodate lifting structures, such as forks of a lift vehicle or truck used to handle and transport gas filtering unit 36. Carrier members 54 are generally upright U-shaped members having flanges secured by welds or the like to the side wall of gas filtering unit 36.

Figure 5:
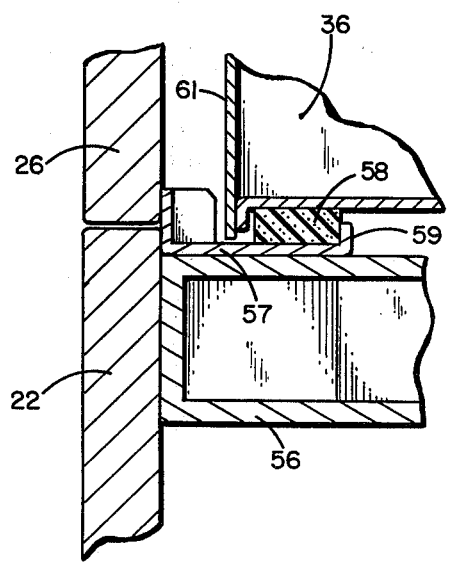
FIG. 5 is an enlarged foreshortened sectional view taken along the line 5—5 of FIG. 3.

As shown in FIGS. 3 and 5, a lower peripheral frame 56 is secured to the wall structure of inlet section 22. Frame 56 comprises generally tubular rectangular members that extend around the front, side and rear parts of inlet section 22. A generally channel-shaped plate 57 is secured to the top of frame 56. A peripheral seal 58 is located between plate 57 and the bottom of filtering unit 36 so that all of the gas moving from intake section 22 must pass through the gas filtering unit 36. Seal 58 is a compressible resilient member, such as expanded rubber or plastic, that extends around the entire periphery of the bottom of gas filtering unit 36. Plate 57 has an upright inside flange 59 that retains the seal on plate 57.

Gas filtering unit 36 is removed from housing 21 with a lift and transport vehicle. The vehicle is attached to the upper two carrier members 54. This raises the bracket hangers 49, 51, 52, and 53 out of their respective pockets in hook rails 41 and 42. The horizontal portions or lips 51A and 53A of the hangers are in alignment with the space 48 and 48A so that gas filtering unit 36 can be moved in a horizontal direction out of housing 21. When gas filtering unit 36 is raised, seal 58 has a slight expansion. Gas filtering unit 36 moves out of engagement with seal 58 so that the bottom edge of gas filtering unit 36 can move through the passageway of open door 26. The transport vehicle is used to load a new filtering unit 36 in housing 21. Hanger lips 49A, 51A, 52A, and 53A are aligned with the spaces 48 and 48A. Gas filtering unit 36 is then moved horizontally into chamber 34. When lips 49A, 51A, 52A, and 53A are over the pockets 43 and 44 in rail 42 and corresponding pockets in rail 41, the unit 36 is lowered onto seal 58. This seals the bottom of gas filtering unit 36 with frames 56 so that all gas moving into the housing 21 must move through gas filtering unit 36.

Referring to FIGS. 6-9, gas filtering unit 36 comprises a box-shaped housing or casing having a flat upright front wall 61, spaced side walls 62 and 63, and a rear upright wall 64. Walls 61-64 are secured together at their adjacent edges to form a one-piece box structure having an open bottom and an open top. The channel shaped carrier members 54 are secured to the upper and lower corner sections of wall 61.

Figure 9:
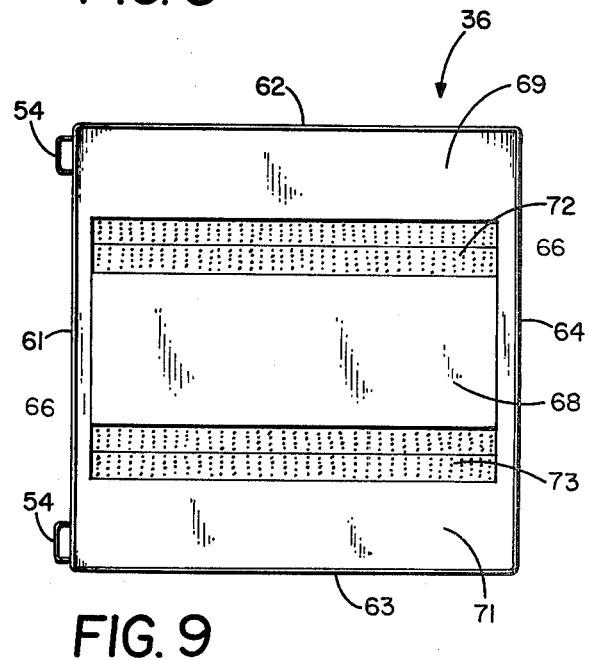
FIG. 9 is a bottom plan view of FIG. 6.

Referring to FIG. 9, a pair of bars 66 and 67 extend across the bottom of housing 21. Bar 66 is secured to the inside of the bottom edge of wall 61. In a similar manner, bar 67 is secured to the inside of the wall 64. A center plate 68 extended between bars 66 and 67 is secured at their opposite ends to the center of the tops of the bars 66 and 67. As shown in FIG. 10, center plate 68 has short upright side edges or flanges 68A that are spaced from side plates 69 and 71. Side plate 69 secured to the lower edge of side wall 62 extends between the bars 66 and 67. Side plate 71 is secured to wall 63 and extends between bars 66 and 67. Side plates 69 and 71 both have short upwardly directed side flanges 69A and 71A. Center plate 68 and side plates 69 and 71 are spaced from each other providing elongated air inlet openings or mouths 72 and 73.

Figure 7:
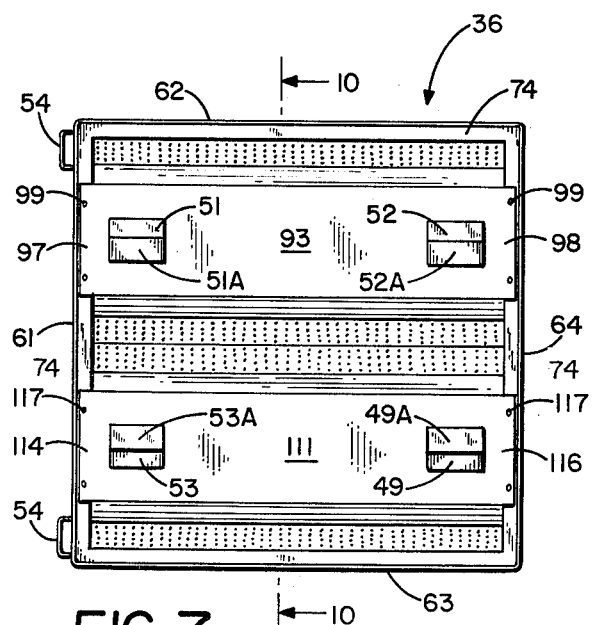
FIG. 7 is a top plan view of FIG. 6.

Referring to FIGS. 7 and 10, a peripheral right angle rail 74 extends around the inside of the upper ends of the walls 61–64. Two pairs of cross members or bars 76 and 77 and 78 and 79 extended across the open end of the housing are secured to the front and rear walls 61 and 64 and to the bottom of rail 74. Cross members 76, 77, and 78, 79 are flat inwardly or convergingly obtuse angle bars that form supports for perforated partitions or walls 81, 82, and 101, 102. A first pair of perforated partitions or walls 81 and 82 are secured to and extend downwardly from cross members 76 and 77. The lower edge of wall 81 is secured to the side wall 62 immediately adjacent the bottom plate 69. The lower end of wall 82 is secured to the center section of center plate 68. A pair of angularly inclined divider perforated partitions or walls 83 and 84 separate the space between walls 81 and 82 into two chambers 89 and 91. The upper ends of divider walls 83 and 84 are secured together at an apex ridge 87 that is located below the cross members 76 and 77. The lower ends of divider walls 83 and 84 are secured to the short upright side flanges 69A and 68A of the side plate 69 and center plate 68. As shown in FIG. 11, the divider wall 84 has a plurality of small holes 86. Each of the walls 81, 82, 83, and 84 is provided with holes similar to the holes shown in FIG. 11. The divided walls 83 and 84 converge upwardly and define an air inlet chamber 88 in alignment with the air inlet opening 72.

The storage chambers 89 and 91 are filled with air filtering medium 92, such as charcoal and the like. Other types of gas filtering materials, such as activated carbon and oxidizer materials, can be used in the gas filtering unit 36. The gas filtering materials include mechanical and chemical filters and odor and particle adsorption and absorption materials.

The top areas of chambers 89 and 91 are closed with a cover 93. Cover 93 has downwardly and outwardly directed side flanges 94 and 96 that fit onto the outside surfaces of cross members 76 and 77 and thereby close the top of the chambers 89 and 91. Hangers 51 and 52 are secured to opposite ends of cover 93. As shown in FIG. 7, cover 93 has end portions or lips 97 and 98 that fit in an overlapping relationship on the rail 74. A plurality of fasteners 99, such as nut and bolt assemblies, releasably attach cover 93 to the rail 74.

Returning to FIG. 10, a second pair of perforated partitions or walls 101 and 102 are located on the right half of gas filtering unit 36. Generally converging inverted V-shaped perforated divider walls 103 and 104 are positioned between the walls 101 and 102. Divider walls 103 and 104 have a top linear edge or ridge 106 that is located below cross members 78 and 79. The space between the divider walls 103 and 104 is an air inlet chamber 107 in communication with the air inlet opening or mouth 73. The spaces between the walls 101 and 103 and 102 and 104 comprise a pair of upright storage chambers 108 and 109 for gas filtering and cleaning medium, such as charcoal.

The common top of chambers 108 and 109 is closed with cover 111. As shown in FIG. 10, cover 111 is a generally flat plate having downwardly and outwardly directed side flanges 112 and 113 that fit in an overlapping relationship on cross members 78 and 79. Brackets or hangers 53 are attached to opposite portions of cover 111. As shown in FIG. 7, cover 111 has end extensions or lips 114 and 116 that fit over rail 74. A plurality of fasteners 117, such as nut and bolt assemblies, attach cover 111 to rail 74.

Returning to FIG. 10, walls 82 and 101 diverge from each other to provide a center outlet passage 118. The outside perforated walls 81 and 102 diverge from the outside walls of the housing 62 and 63 and form side air outlet passages 119 and 121.

Referring to FIG. 12, chamber 89 is divided into three sections by upright walls or dividers 122. Upright transverse walls 123, 124, and 126 divide chambers 91, 108, and 109 into three similar sections. The sections of each chamber have substantially identical size so that they accommodate substantially equal amounts of gas filtering and cleaning medium.

In use, as indicated by the arrows in FIG. 10, the gas moves through the inlet openings or mouths 72 and 73 into the inlet passages 88 and 107. The gas can be air contaminated with smoke, grease, particulates, and odors. Other gases can be cleaned with the gas cleaning system 20. The gas flows through the plurality of holes 86 in inside walls 83 and 84 and 103 and 104 and through the filtering medium 92 in each of the chambers. Filtering medium 92 has a substantially uniform thickness through all the chambers so that the gas uniformly flows through the filtering medium 92 in the chambers. The filtered gas moves through outside walls 81, 82, 101, and 102 into the exit or outlet chambers 118, 119, and 121. The gas passes between the covers 93 and 111 to the upper or outlet portions of the gas filtering system.

When the capacity of the gas filtering medium has been reached with foreign particles, odors, and the like, gas filtering unit 36 is removed from the housing 21. This is accomplished by opening door 24. A forklift truck or transport vehicle is used to elevate gas filtering unit 36 until hanger brackets 51 and 53 clear the upper part of the hook rails 41 and 42. This upward movement also releases the bottom of the air filtering unit from seal 58. Gas filtering unit 36 can now be moved horizontally out of the housing. Covers 93 and 111 are removed by releasing the fasteners 99 and 117.

The entire gas filtering unit 36 can then be turned upside down, thereby dumping the filtering medium 92 from chambers 89, 91, 108 and 109. Recharged filtering or new medium is then placed into chambers 89, 91, 108 and 109. The level of the medium is placed above the top edges 87 and 106. Covers 93 and 111 are then secured to the rail 74 to close the tops of the chambers 89, 91, 108 and 109. Gas filtering unit 36 is now ready for placement back into the housing of the gas cleaning system.

While there has been shown and described the preferred embodiment of the gas cleaning system and the gas filtering unit of the invention, it is understood that changes in the structures and sizes and materials may be made by those skilled in the art without departing from the invention. The invention is defined in the following Claims.

The embodiments of the invention in which an exclusive property or privilege is claimed are defined as follows:

1. A gas filtering unit comprising: a housing having continuous side walls, an open inlet end, and open outlet end; a plurality of plate means located adjacent the inlet end of the housing and extended across the inlet end thereof, means mounting said plate means on the housing, adjacent said plate means being spaced from each other to provide gas inlet openings, cross bar means secured to the outlet end of the housing and to rail means extending around said outlet end and said cross bar means extends across the outlet end thereof generally parallel to the plate means; a plurality of perforated walls extended between the plate means and cross bar means and secured thereto, said walls forming chambers for accommodating gas filtering means, said chambers having open upper ends; gas filtering means located in said chambers; cover means engageable with the cross bar means for closing the open upper ends of the chambers; and means attaching the cover means to the rail means so as to hold the cover means in engagement with the cross bar means.

2. The gas filtering unit of claim 1 wherein: the perforated walls include first perforated walls secured to the plate means and cross bar means, and second perforated walls secured to the plate means, said second perforated walls comprising pairs of perforated walls having upper ends joined together below the cover means.

3. The gas filtering unit of claim 1 wherein: the cross bar means include first and second pairs of bars, said perforated walls include first wall means comprising first, second, third, and fourth perforated walls, said first and fourth walls having portions secured to the first pair of cross bars, said second and third walls having portions joined together and located below said cover means mounted on the first pair of cross bars, and second wall means comprising fifth, sixth, seventh, and eighth perforated walls, said fifth and eighth walls having portions secured to the second pair of cross bars, said sixth and seventh walls having portions joined together below said cover means mounted on the second pair of cross bars.

4. The gas filtering unit of claim 3 wherein: the plate means comprise a center plate and side plates, said side plates spaced from the center plate to form a pair of said gas inlet openings.

5. The gas filtering unit of claim 4 including: bars secured to the side walls of the inlet end of the housing, said center plate and side plates being mounted on the bars.

6. The gas filtering unit of claim 1 wherein: the plate means comprise a center plate and side plates, said side plates being spaced from the center plate to form a pair of said gas inlet openings, the perforated walls comprise a first pair of perforated walls secured to one of said side plates, two pair of perforated walls secured to said center plate, and a second pair of perforated walls secured to the other of said side plates, each pair of perforated walls forming one of said chambers accommodating gas filtering material.

7. The gas filtering unit of claim 1 wherein: said means includes a rail extended around the inside of the outlet end of the side walls of the housing, and said attaching means includes releasable fasteners securing the cover means to said rail.

8. The gas filtering unit of claim 1 including: hanger means secured to the cover means to support the unit on support structure.

9. The gas filtering unit of claim 8 wherein: the hanger means are brackets having inwardly directed lips.

10. The gas filtering unit of claim 1 wherein: the cross bar means comprise first and second pairs of bars extended across the outlet end of the housing, one of said perforated walls being secured to each bar whereby the space between adjacent bars of a pair of bars is the inlet to separate chambers formed by the perforated walls.

11. The gas filtering unit of claim 10 wherein: the cover means comprise a first cover engageable with the first pair of bars and a second cover engageable with the second pair of bars.

12. The air filtering unit of claim 11 wherein: each of said covers has side flanges located adjacent the sides of a pair of said bars when the cover is engageable with said pair of said bars.

13. Gas filtering structure comprising: a gas filtering unit having hanger means to support the unit; a housing having an upper end, a lower end, a chamber for accommodating said gas filtering unit, said housing having gas inlet means and gas outlet means, said gas inlet means and said gas outlet means being in communication with said chamber; means mounted in the housing for supporting the gas filtering unit in the chamber, said means including rail means having at least one horizontal upright flange, said flange having means cooperating with the hanger means to support the gas filtering unit on the means mounted on the housing.

14. The structure of claim 13 wherein: said hanger means having lateral lips, said means cooperating with the hanger means comprise pockets for accommodating said lips.

15. The structure of claim 13 wherein: the hanger means includes first and second hangers, said means mounted on the housing includes a pair of rails, each rail having a horizontal upright flange, each flange having means cooperating with one of the first and second hangers to support the air filtering unit on the means mounted on the housing.

16. The structure of claim 15 wherein: the means cooperating with one of the first and second hangers comprise at least one pocket for accommodating a portion of said one of the hangers.

17. The structure of claim 13 including: a member secured to the inside of the lower end of the housing, and seal means mounted on said member engageable with the gas filtering unit.

18. The structure of claim 13 wherein: the hanger means includes first and second hangers, each of said hangers having a lateral lip, said lip being adapted to be located in a pocket in a flange.

19. The structure of claim 13 wherein: said gas filtering unit has continuous side walls surrounding said gas inlet and gas outlet, a plurality of plate means located adjacent the inlet end of the side walls, means mounting said plate means on the side walls, adjacent said plate means being spaced from each other to provide said gas inlet, cross bar means secured to the outlet end of the side walls and to said rail means and said cross bar means extending across the gas outlet generally parallel to the plate means, a plurality of perforated walls extended between the plate means and cross bars, some of said walls being secured to the plate means and cross bars, said walls forming chambers for accommodating gas filtering means, said chambers having openings providing access to said chambers, gas filtering means located in said chambers, cover means engageable with the cross bar means for closing the openings providing access to said chambers, said hanger means being mounted on said cover means, and means attaching the cover means to the rail means to hold the cover means in engagement with the cross bar means.

20. The structure of claim 19 wherein: the perforated walls include first perforated walls secured to the plate means and cross bar means, and second perforated walls secured to the plate means, said second perforated walls comprising pairs of perforated walls having upper ends joined together below the cover means.

21. The structure of claim 19 wherein: the hanger means are brackets having inwardly directed lips.

22. The structure of claim 19 wherein: the cross bar means comprise first and second pairs of bars extended across the outlet, one of said perforated walls being secured to each of said bars whereby the space between adjacent said bars of a pair of said bars is the outlet to the separate chambers formed by the walls.

23. The structure of claim 22 wherein: the cover means comprise a first cover engageable with a first pair of said bars and a second cover engageable with the second pair of said bars.

24. The structure of claim 23 wherein: each cover has side flanges located adjacent the sides of a pair of the bars.

25. The structure of claim 19 wherein: said hanger means have lateral lips, said means cooperating with the hanger means comprise pockets for accommodating said lips.

26. The structure of claim 19 wherein: the hanger means includes first and second hangers, said rail means includes a pair of rails, each rail having a horizontal upright flange, each flange having means cooperating with one of the first and second hangers to support the air filtering unit on the rail means.

27. The structure of claim 26 wherein: the means cooperating with one of the first and second hangers comprise at least one pocket for accommodating a portion of said one of the hangers.

28. The structure of claim 19 including: a member secured to the inside of the lower end of the housing, and seal means mounted on said member engageable with the gas filtering unit.

* * * * *